US012620710B2

(12) United States Patent
Parsche et al.

(10) Patent No.: US 12,620,710 B2
(45) Date of Patent: May 5, 2026

(54) ELECTRONIC DEVICE WITH ISOFLUX ANTENNA AND RELATED METHODS

(71) Applicant: EAGLE TECHNOLOGY, LLC, Melbourne, FL (US)

(72) Inventors: Francis E. Parsche, Palm Bay, FL (US); Edward G. Palmer, Indialantic, FL (US); Olivia Stannard, Jersey City, NJ (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 107 days.

(21) Appl. No.: 18/425,594

(22) Filed: Jan. 29, 2024

(65) Prior Publication Data

US 2025/0246813 A1 Jul. 31, 2025

(51) Int. Cl.
*H01Q 5/48* (2015.01)
*H01Q 9/04* (2006.01)

(52) U.S. Cl.
CPC ............... *H01Q 5/48* (2015.01); *H01Q 9/045* (2013.01)

(58) Field of Classification Search
CPC ................................. H01Q 5/48; H01Q 9/045
See application file for complete search history.

(56) References Cited

U.S. PATENT DOCUMENTS 5,892,480 A 4/1999 Killen
5,986,616 A * 11/1999 Edvardsson ............. H01Q 1/38 343/858
9,054,414 B2 6/2015 Mizzoni et al.
11,682,841 B2 6/2023 Parsche
2003/0016185 A1* 1/2003 Morooka ............... H01Q 1/362 343/895
2023/0253700 A1 8/2023 Parsche
2024/0136726 A1 4/2024 Parsche
2024/0136727 A1 4/2024 Parsche

FOREIGN PATENT DOCUMENTS

CN 201523073 U * 7/2010
CN 205564981 U * 9/2016

OTHER PUBLICATIONS

John D. Kraus “Helical Beam Antennas For Wide-Band Applications” Proceedings Of The Institute Of Radio Engineers, 36, pp. 1236-1242, Oct. 1948.

Hidetsufu Yagi “Beam Transmission Of Short Waves”, Proceedings of the Institute Of Radio Engineers, 1928, vol. 16, Issue 6, pp. 715-740).

Hassan et al. “X-Band Isoflux Concentric Circular Antenna Arrays for Image Data Download from LEO Satellites to Ground Stations” Aces Journal, vol. 34, No. 11, Nov. 2019; pp. 1694-1703.

(Continued)

*Primary Examiner* — Dieu Hien T Duong
(74) *Attorney, Agent, or Firm* — ALLEN, DYER, DOPPELT, + GILCHRIST, P.A.

(57) ABSTRACT

An electronic device includes an RF device, and an antenna. The antenna includes an elongate support, and helically wound conductive strips carried by the elongate support and with adjacent conductive strips having an angular spacing. The electronic device includes a feed structure coupling the RF device to the helically wound conductive strips.

27 Claims, 11 Drawing Sheets

(56) References Cited

OTHER PUBLICATIONS

Guarriello et al. " Advanced Optimization of an Isoflux Reflectarray" Advanced Optimization of an Isoflux Reflectarray. 2022 IEEE MTT-S International Conference on Numerical Electromagnetic and Multiphysics Modeling and Optimization (NEMO), Jul. 2022, Limoges, France. pp. 1-4.

Fouany et al. "New Concept of Telemetry X-Band Circularly Polarized Antenna Payload for CubeSat" IEEE Antennas and Wireless Propagation Letters, vol. 16, 2017; pp. 2987-2991.

Del Rio et al. "Novel Isoflux Antenna Alternative for LEO Satellites Downlink" 29th European Microwave Conference—Munich 1999; pp. 4.

Da Silva Moreira et al. "Classical Axis-Displaced Dual-Reflector Antennas for Omnidirectional Coverage" IEEE Transactions on Antennas and Propagation, vol. 53, No. 9, Sep. 2005 pp. 2799-2808.

Charles C. Kilgus "Shaped-Conical Radiation Pattern Performance of the Backfjre Qnadrifilar Helix" EEE Transactiom on Antenxas and Propagation, May 1975; pp. 392-397.

Ravanelli et al. "Multi-objective optimization of an isoflux antenna for LEO satellite downhandling link" Microwave Radar and Wireless Communications (MIKON), 2010 18th International Conference: Jul. 2010; pp. 5.

Shankararaman Ramakrishnan "Enhancing Satellite Navigation for Low Earth and Geostationary Orbit Missions" 2018 https://searchworks.stanford.edu/view/12809880 pp. 208.

Lee et al. "Cavity-Backed Archimedean Spiral Antenna with Conical Perturbations for 3U CubeSat Applications" Digital Object Identifier 10.1109/MAP.2018.2870586 Date of publication: Nov. 29, 2018; pp. 8.

* cited by examiner

ELECTRONIC DEVICE WITH ISOFLUX ANTENNA AND RELATED METHODS

TECHNICAL FIELD

The present disclosure relates to the field of communications, and, more particularly, to a wireless communications device and related methods.

BACKGROUND

Although the field of antennas is approximately 130 years old, antenna types and their designs may remain artisan in nature. Radiation pattern requirements, in and of themselves, may not suggest all possible antenna shapes that are useful. For example, Fourier Transform techniques may refer to a radiation pattern shape and to a planar antenna aperture current distribution. Nonetheless, the Fourier Transform may not easily define an end fire antenna.

During a golden age for antenna design, many of the Euclidian geometries were implemented in metal and used as antennas with useful results. Examples may comprise: the line-based wire dipole, the circular loop, the conical horn, and the parabolic reflector antenna, etc. The Euclidian shapes may offer optimizations of the shortest distance between two points for the line dipole. Also, these shapes may offer maximum radiation resistance for length, most area enclosed for least circumference for circular loops and circular patches, and maximum directivity for aperture area.

Elongate antennas may be desirable for Earth satellites as planar broadside firing antennas may not fit within a limited satellite size and area. An elongate antenna of high directivity and gain is provided by a cascade of multiple dipoles known as the Yagi-Uda Antenna. ("Beam Transmission Of Short Waves", Proceedings of the Institute Of Radio Engineers, 1928, Volume 16, Issue 6, pages 715-740). This reference referred to the many directors as a "wave canal". A Yagi-Uda antenna may be narrow in bandwidth, which limits its application, and the beam may be asymmetric.

In an existing approach, an antenna providing circular polarization is an axial mode wire helix antenna. An example is disclosed in "Helical Beam Antennas For Wide-Band Applications", John D. Kraus, Proceedings Of The Institute Of Radio Engineers, 36, pp 1236-1242 October 1948. An improvement to the wire axial mode helix is found in U.S. Pat. No. 5,892,480 to Killen, assigned to the present application's assignee. This approach for a directional antenna comprises a helix-shaped antenna. Although this antenna is directional, the gain and bandwidth performance may be less than desirable.

For low Earth orbit (LEO) satellites, it may be helpful to have a "isoflux" radiation pattern. In particular, this special shape antenna radiation pattern may provide a constant signal strength on the Earth surface from LEO satellites. Since the LEO satellite is moving relative to the surface of the Earth, the signal strength may vary without the special isoflux radiation pattern. In particular, a lower gain is needed straight down at nadir, and a higher gain is needed towards the horizon.

SUMMARY

Generally, an electronic device comprises a radio frequency (RF) device, and an antenna. The antenna comprises an elongate support, and a plurality of helically wound conductive strips carried by the elongate support and with adjacent conductive strips having an angular spacing therebetween. The electronic device comprises a feed structure coupling the RF device to the plurality of helically wound conductive strips.

In some embodiments, the feed structure may comprise a plurality of electrically conductive feeds coupling the RF device to respective proximal ends of the plurality of helically wound conductive strips. Also, the plurality of helically wound conductive strips may comprise four strips. The angular spacing between adjacent strips may comprise ninety degrees, for example.

Also, the elongate support may comprise a dielectric rod, and the plurality of helically wound conductive strips may extend outwardly from the dielectric rod. In other embodiments, the elongate support may comprise a dielectric tube surrounding the plurality of helically wound conductive strips.

The antenna may comprise a ground plane adjacent the feed structure. Respective distal ends of the plurality of helically wound conductive strips may be electrically coupled together. Each of the plurality of helically wound conductive strips may have a constant helical pitch along the elongate support. Each of the plurality of helically wound conductive strips may include a corrugated helically wound conductive strip. The antenna may have an isoflux antenna gain pattern. For example, the antenna may have an operating frequency in a range of 1100-1700 MHz, and the antenna may have a diameter between 0.2 and 0.6 wavelengths of the operating frequency.

Another aspect is directed to an isoflux antenna device for an RF device. The isoflux antenna device comprises an elongate support, a plurality of helically wound conductive strips carried by the elongate support and with adjacent conductive strips having an angular spacing therebetween, and a plurality of electrically conductive feeds coupling the RF device to respective proximal ends of the plurality of helically wound conductive strips.

Yet another aspect is directed to a method for making an antenna for an electronic device. The method comprises forming the antenna comprising an elongate support, and a plurality of helically wound conductive strips carried by the elongate support and with adjacent conductive strips having an angular spacing therebetween. The method also includes coupling a feed structure between an RF device and respective proximal ends of the plurality of helically wound conductive strips.

DETAILED DESCRIPTION

Figure 1:
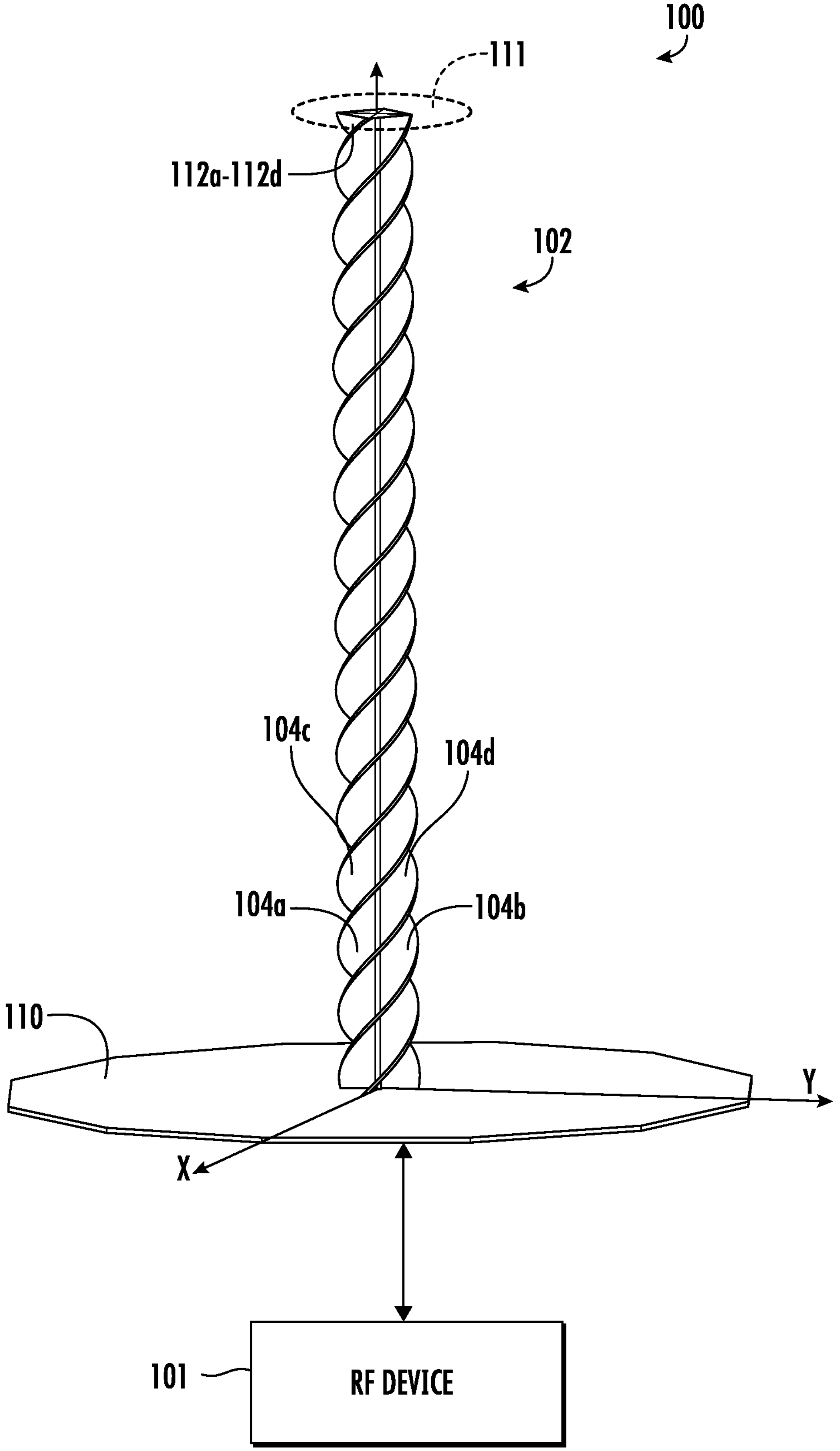
FIG. 1 is a perspective view of an electronic device, according to a first example embodiment of the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIGS. 1-4, an electronic device 100 according to the present disclosure is now described. The electronic device 100 comprises an RF device 101, and an antenna 102. For example, the electronic device 100 may be used in airborne communications applications, such as a LEO satellite. The antenna 102 comprises an elongate support 103. Here, the elongate support 103 illustratively comprises a dielectric rod.

The antenna 102 comprises a plurality of helically wound conductive strips 104*a*-104*d* (i.e., an Archimedean screw structure) carried by the elongate support and extending outwardly from the dielectric rod. The plurality of helically wound conductive strips 104*a*-104*d* includes adjacent conductive strips having an angular spacing therebetween. In particular, the angular spacing between adjacent strips 104*a*-104*d* is illustratively ninety degrees, for example. Each of the plurality of helically wound conductive strips 104*a*-104*d* illustratively includes a constant helical pitch along the elongate support 103. In other embodiments, the plurality of helically wound conductive strips 104*a*-104*d* illustratively may have a varying helical pitch, for example, decreasing pitch with interstrip spacing being reduced to control wave velocity. In some embodiments, each of plurality of helically wound conductive strips 104*a*-104*d* comprises solid electrically conductive material (e.g., aluminum, copper, gold, silver), and in yet other embodiments, each of plurality of helically wound conductive strips 104*a*-104*d* comprises a dielectric base material (e.g., polymer plastic) plated with an electrically conductive material (e.g., aluminum, copper, gold, silver).

In the illustrated embodiment, the plurality of helically wound conductive strips 104*a*-104*d* have a constant diameter. In other embodiments, the plurality of helically wound conductive strips 104*a*-104*d* may have a varying diameter along the length of the elongate support 103, for example, tapering (i.e., reducing diameter) towards the distal end of the antenna 102. Further, although the illustrated embodiment of the plurality of helically wound conductive strips 104*a*-104*d* shows a constant thickness in each strip, other embodiments may vary the thickness along the length of the elongate support 103.

Figure 2:
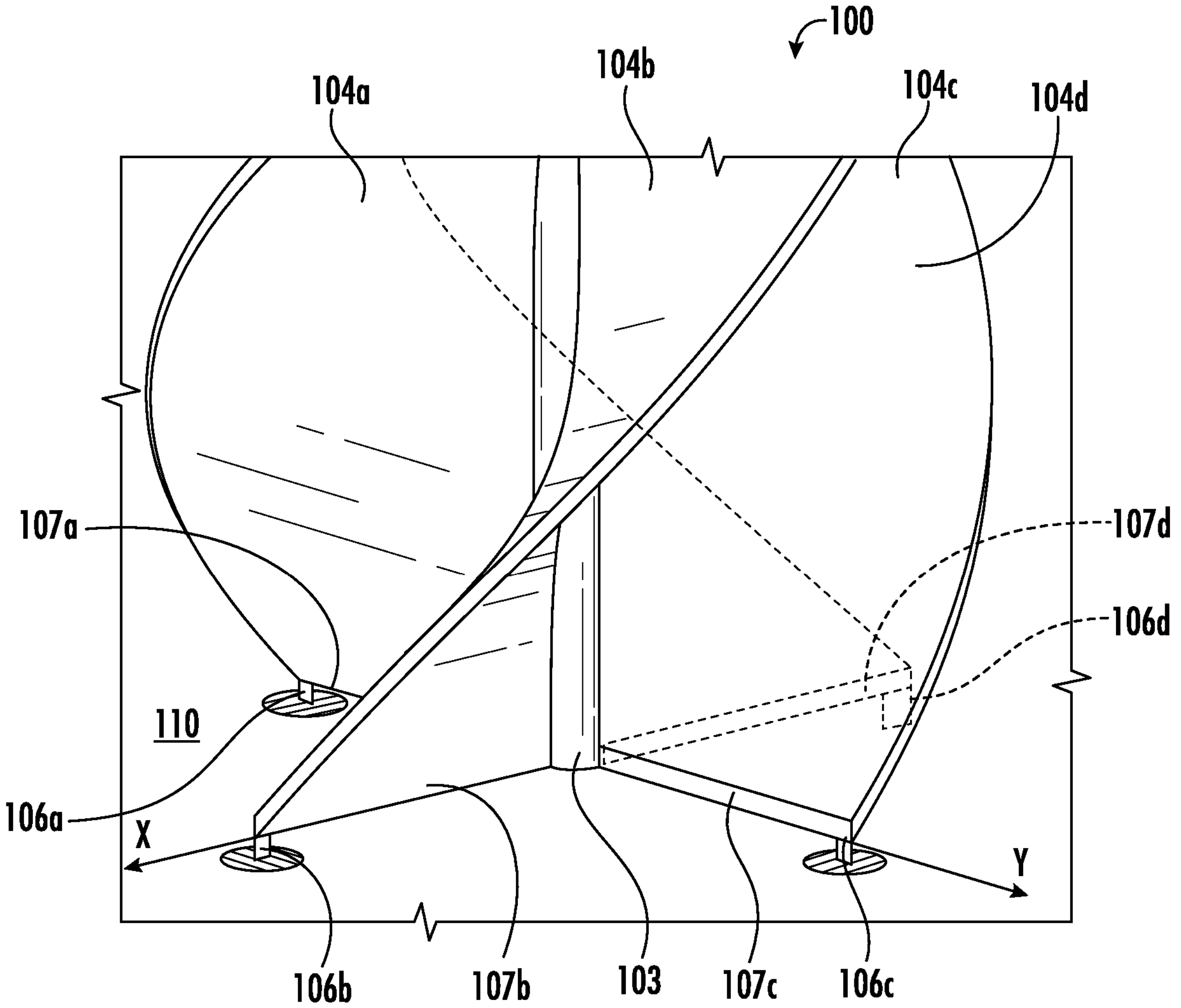
FIG. 2 is an enlarged perspective view of the electronic device from FIG. 1.

In the exemplary embodiment depicted in FIGS. 1-2, the plurality of helically wound conductive strips 104*a*-104*d* comprises four strips. In other embodiments, the number of strips may vary, for example, three strips with 120 degrees angular spacing.

Figure 3:
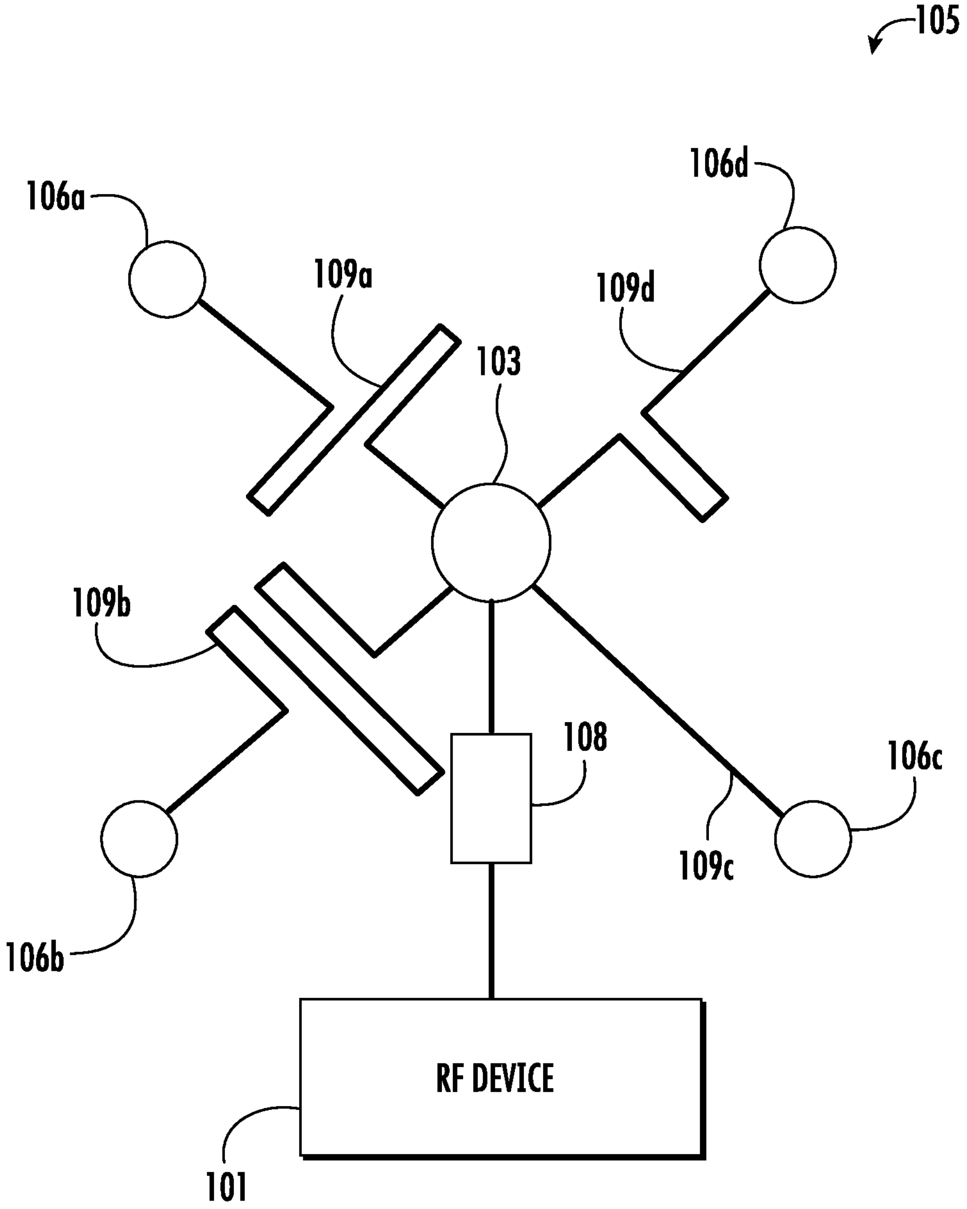
FIG. 3 is a schematic diagram of an impedance matching network for the electronic device from FIG. 1.

As perhaps best seen in FIG. 3, the electronic device comprises a feed structure 105 comprising a plurality of electrically conductive meandering traces 109*a*-109*d* (creating the desired phase shift), a plurality of electrically conductive feeds 106*a*-106*d* coupling the RF device 101 to respective proximal ends 107*a*-107*d* of the plurality of helically wound conductive strips 104*a*-104*d*, and an impedance transformer 108 (e.g., 0.25 wave transformer) coupled between the RF device 101 and the plurality of electrically conductive meandering traces 109*a*-109*d*. In some embodiments, the antenna 102 has a reduced input impedance, and the impedance transformer 108 may provide an approach to this issue.

The antenna 102 illustratively comprises a ground plane 110 adjacent to the feed structure 105. Here, the ground plane 110 is illustratively circle-shaped, but in other embodiments, the ground plane may have other shapes or may even be omitted. In particular, as perhaps best seen in FIG. 2, the plurality of electrically conductive feeds 106*a*-106*d* extends through (while being insulated therefrom) the ground plane 110 and is coupled to the respective proximal ends 107*a*-107*d* of the plurality of helically wound conductive strips 104*a*-104*d*. The ground plane 110 comprises an electrically conductive material (e.g., aluminum, copper, gold, silver).

Noted with dashed lines, the antenna 102 may include a focusing element 111 comprising an electrically conductive material. The focusing element 111 electrically couples together respective distal ends 112*a*-112*d* of the plurality of helically wound conductive strips 104*a*-104*d*. In some embodiments, the focusing element 111 may comprise a square-shaped conductive element.

Table 1 provides specifications of a nonlimiting example embodiment.

TABLE 1

Physical Parameters Of An Example Embodiment

| Parameter | Value | Discussion |
|---|---|---|
| Frequency | 1575.42 MHz | GPS L1 |
| Height | 41.4 cm | 2.15λ |
| Antenna diameter | 3.42 cm | 0.179λ |
| Antenna circumference | 10.74 | 0.56λ |
| Number of fin volutes | 4 | |
| Fin thickness | 0.15 cm | |
| Fin volute rotational sense | Clockwise | As viewed from the antenna base and in the direction of radiation |
| Center cylindrical cavity diameter | 0.3 cm | May be larger if structural needs require |
| Volute fin material | Metal plated 3D printed plastic | |
| Top shorting cap | Metal disc 4.42 cm diameter | Electrically connects volutes together |
| Ground plane diameter | 45 cm | Other diameters permissible with back lobe trade |
| Mechanical support | Plastic center rod or sections thereof | |
| Mechanical support | External foam cylinder | Rohacell 51 HF material |
| Coaxial connector | SMA chassis with projecting pin | M/A COM 2052-1352-00 |

Table 2 provides the electrical performance parameters of the Table 1 example.

TABLE 2

| Electrical Performance Parameters | | |
|---|---|---|
| Application | Low earth orbit space antenna | |
| Electrical excitation | 4 port phase quadrature | Equal amplitude with phase advance of 90° each port |
| Nominal operating frequency | 1575.42 MHz | GPS L1 |
| Radiation pattern shape | Isoflux/ conical | Constant signal strength over entire earth view |
| Realized gain at nadir | 0 dBic | |
| Realized gain at earth horizon | 6 dBic | 550 KM orbit, 60 degrees off nadir |
| Polarization | Left hand circular (LHCP) | Reversing fin volute sense and phasing will produce RHCP |
| Polarization axial ratio | 24 dB at nadir, 20 dB at earth horizon | |

Figure 4:
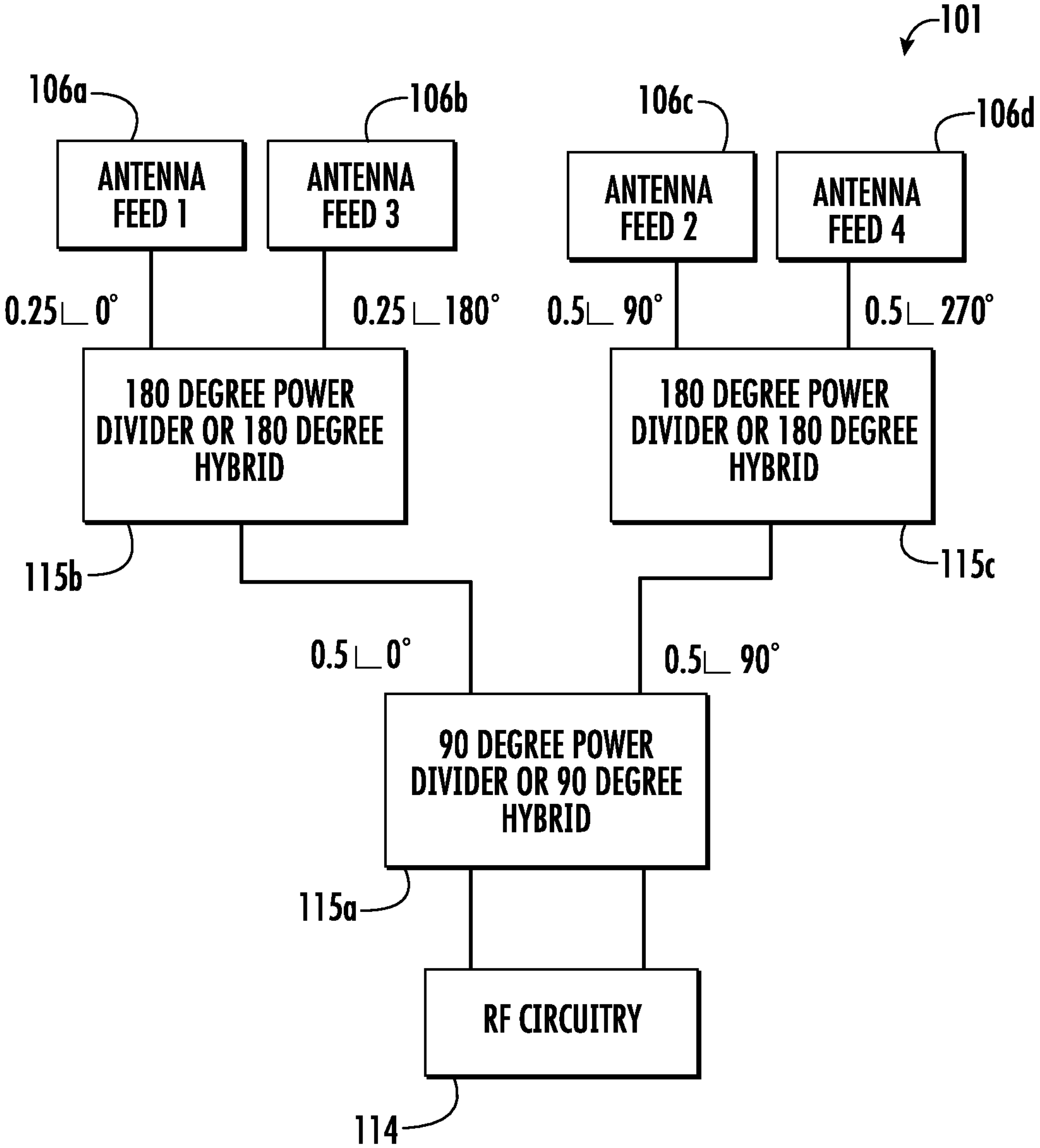
FIG. 4 is a schematic diagram of a feed network for the electronic device from FIG. 1.

As perhaps best seen in FIG. 4, the RF device 101 illustratively comprises RF circuitry 114 (e.g., having a 50Ω termination) configured to generate a plurality of feed signals respectively for the plurality of helically wound conductive strips 104*a*-104*d*, and a plurality of power dividers 115*a*-115*c* coupled downstream from the RF circuitry. In some embodiments, each of the plurality of feed signals has substantially equal power (i.e., ±5% of a set power level). Further, the RF device 101 is configured to generate the plurality of feed signals with respective phase spacing of ninety degrees (i.e., a quadrature phase). In other words, the plurality of feed signals have a phase of 0°, 90°, 180°, and 270°.

As viewed from the base or non-radiating end of the antenna 102 and into the direction of radiation, and in order to produce lefthand circular polarization, the plurality of helically wound conductive strips 104*a*-104*d* will be wound in a clockwise sense and the electrical feed ports will advance in phase 90° port by port (0.25L0°, 0.25L90°, 0.25L180°, and 0.25L270°) in a clockwise sense. As viewed from the base or non-radiating end of the antenna 102 and into the direction of radiation, and in order to produce righthand circular polarization, the plurality of helically wound conductive strips 104*a*-104*d* will be wound in a counterclockwise sense and the electrical feed ports will advance in phase 90° port by port (0.25⌊0°, 0.25⌊90°, 0.25⌊180°, and) 0.25⌊270° in a counterclockwise sense.

In some embodiments, the electronic device 100 may comprise additional circuits (not shown) carried by a circuit board mounted to the ground plane 110. For example, the additional circuits may comprise beam forming circuitry.

Helpfully, the antenna 102 has an isoflux antenna gain pattern, which may be desirable for some applications, such as LEO satellites. For example, the antenna 102 may have an operating frequency in a range of 1100-1700 MHz, and the antenna may have a diameter between 0.2 and 0.6 wavelengths of the operating frequency. Also, the antenna 102 may have a length between 1.5 and 2.6 wavelengths, and a circumference between 0.25 and 0.75 wavelengths. The helical winding pitch may be in the range of 1.45 to 1.95 wavelengths.

A theory of operation for the electronic device 100 will now be described. The plurality of helically wound conductive strips 104*a*-104*d* constitute hybrid loop dipole radiating elements as they both curl and diverge the flow of RF electrical current. Thus, a means of radiation pattern shape adjustment is provided by trading the aspect ratio of the antenna 102. The plurality of helically wound conductive strips 104*a*-104*d* additionally defines an open wire transmission in phase quadrature. The significance of this is the current distribution in the plurality of helically wound conductive strips 104*a*-104*d* to not roll off to lower current values on the distal radiating end. Herein disclosed is a method of adjusting driving resistance at the electrically conductive feeds 106*a*-106*d* by adjustment of helically wound conductive strips 104*a*-104*d* dimensions. In other words, wider/fatter helically wound conductive strips 104*a*-104*d* lower driving resistance and thinner/skinnier helically wound conductive strips increase driving resistance. Another method is to adjust the cone angle of the conical isoflux radiation pattern by adjustment of the dimensions of the helically wound conductive strips 104*a*-104*d*. Taller and smaller diameter helically wound conductive strips 104*a*-104*d* will radiate with a narrower radiation pattern cone angle, which may be preferential for high satellite altitude isoflux. Shorter and smaller diameter helically wound conductive strips 104*a*-104*d* will radiate with a wider radiation pattern cone angle, which may be preferential for LEO isoflux. The helically wound conductive strips 104*a*-104*d* carry standing wave current distributions, so circular polarization is synthesized by the phase quadrature (0, 90, 180, 270 phase) electrical rotation of the excitation currents to electrically conductive feeds 106*a*-106*d*. The ground plane 110 enforces radiation into the upper half space, and without it, the radiation pattern of the antenna 102 would be bidirectional.

Yet another aspect is directed to a method for making an antenna 102 for an electronic device 100. The method comprises forming the antenna 102 comprising an elongate support 103, and a plurality of helically wound conductive strips 104*a*-104*d* carried by the elongate support and with adjacent conductive strips having an angular spacing therebetween. The method also includes coupling a feed structure 105, the feed structure comprising a plurality of electrically conductive feeds 106*a*-106*d* coupling an RF device 101 to respective proximal ends 107*a*-107*d* of the plurality of helically wound conductive strips.

Figure 5:
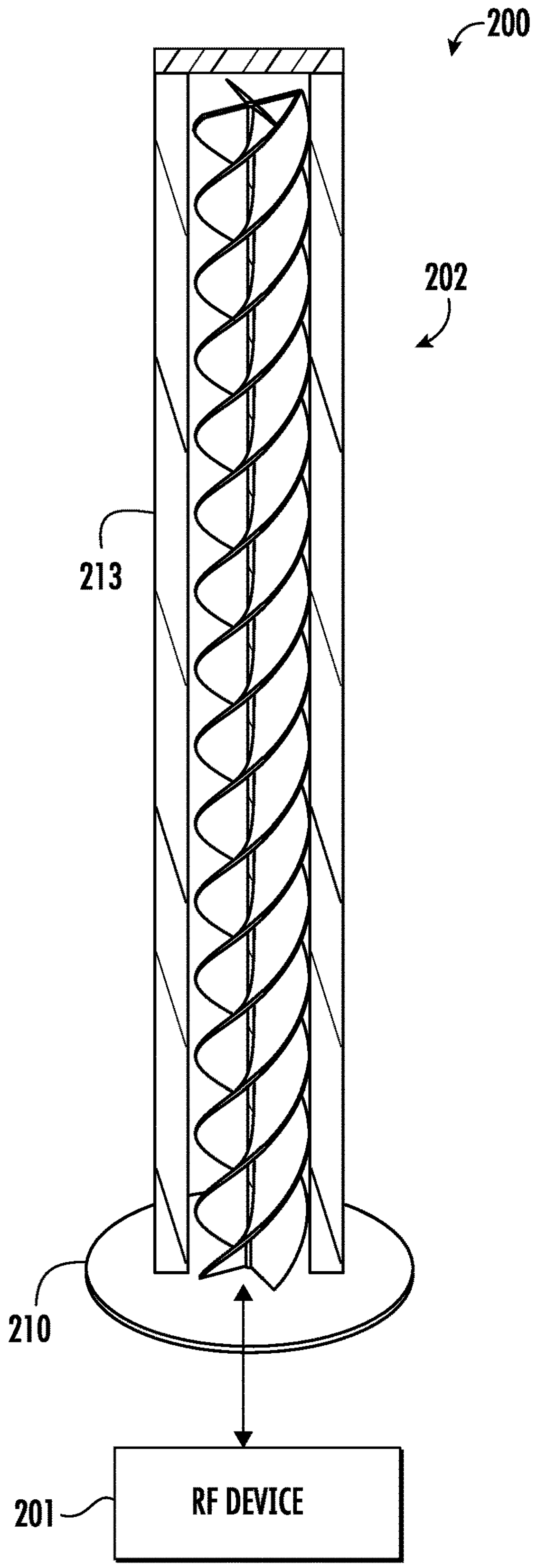
FIG. 5 is a perspective view of an electronic device, according to a second example embodiment of the present disclosure.
Figure 6:
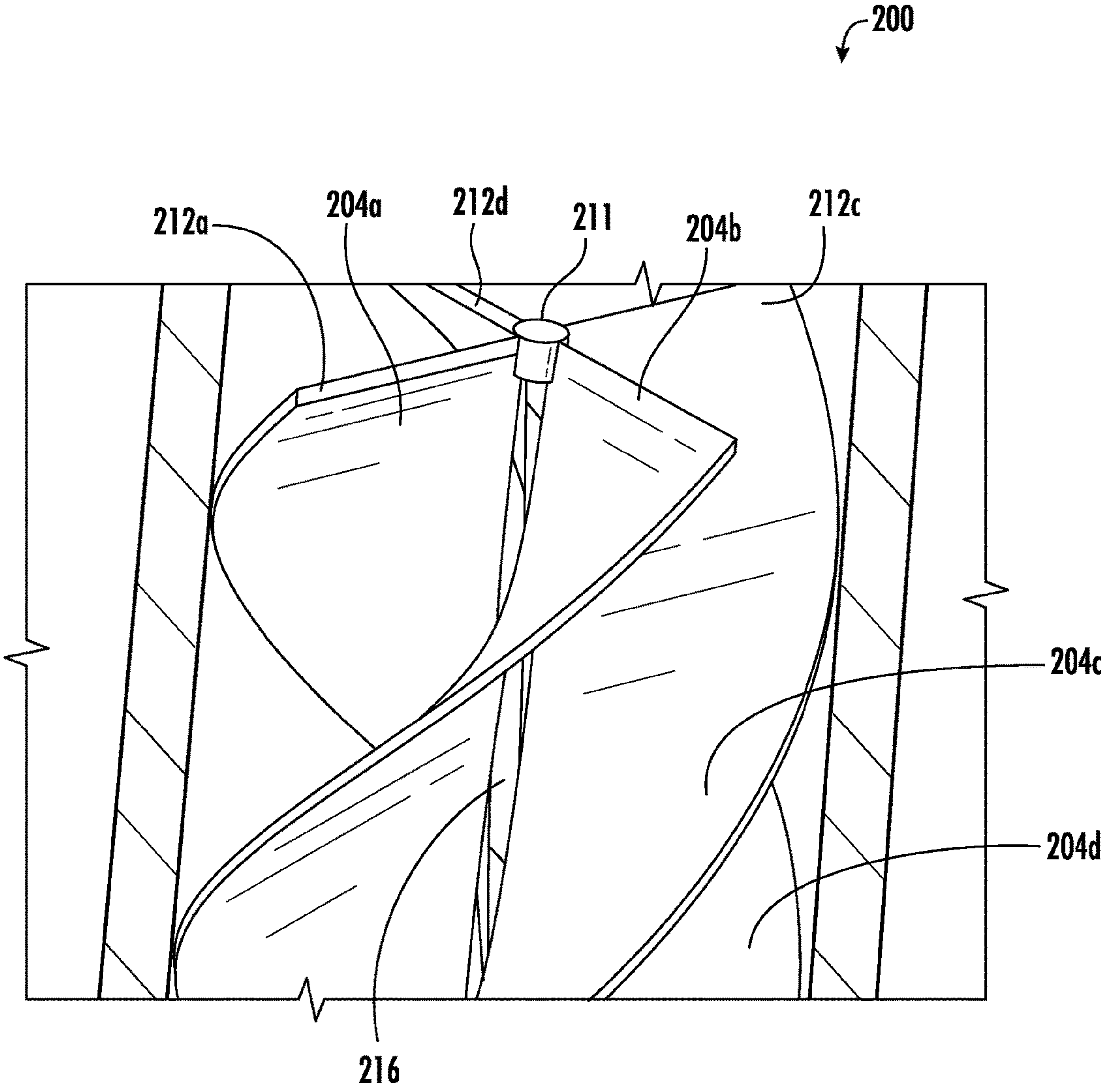
FIG. 6 is an enlarged perspective view of the electronic device from FIG. 5.

Referring now additionally to FIGS. 5-6, another embodiment of the electronic device 200 is now described. In this embodiment of the electronic device 200, those elements already discussed above with respect to FIGS. 1-2 are incremented by 100 and most require no further discussion herein. This embodiment differs from the previous embodiment in that this electronic device 200 illustratively includes an elongate support 203 comprising a dielectric tube 213 (e.g., polymer plastic tube) surrounding the plurality of helically wound conductive strips 204*a*-204*d*, which provides the structural stability of the plurality of helically wound conductive strips. For example, the dielectric tube 213 may comprise a foam tube. Here, the dielectric rod of the embodiments of FIGS. 1-2 is replaced. As perhaps best seen in FIG. 6, the central core 216 of the antenna 202 is air.

The electronic device 200 illustratively includes a focusing element 211 electrically coupling together respective distal ends 212*a*-212*d* of the plurality of helically wound conductive strips 204*a*-204*d*. Here, the focusing element 211 comprises a cylinder-shaped connector positioned between the plurality of helically wound conductive strips 204*a*-204*d*.

Figure 7:
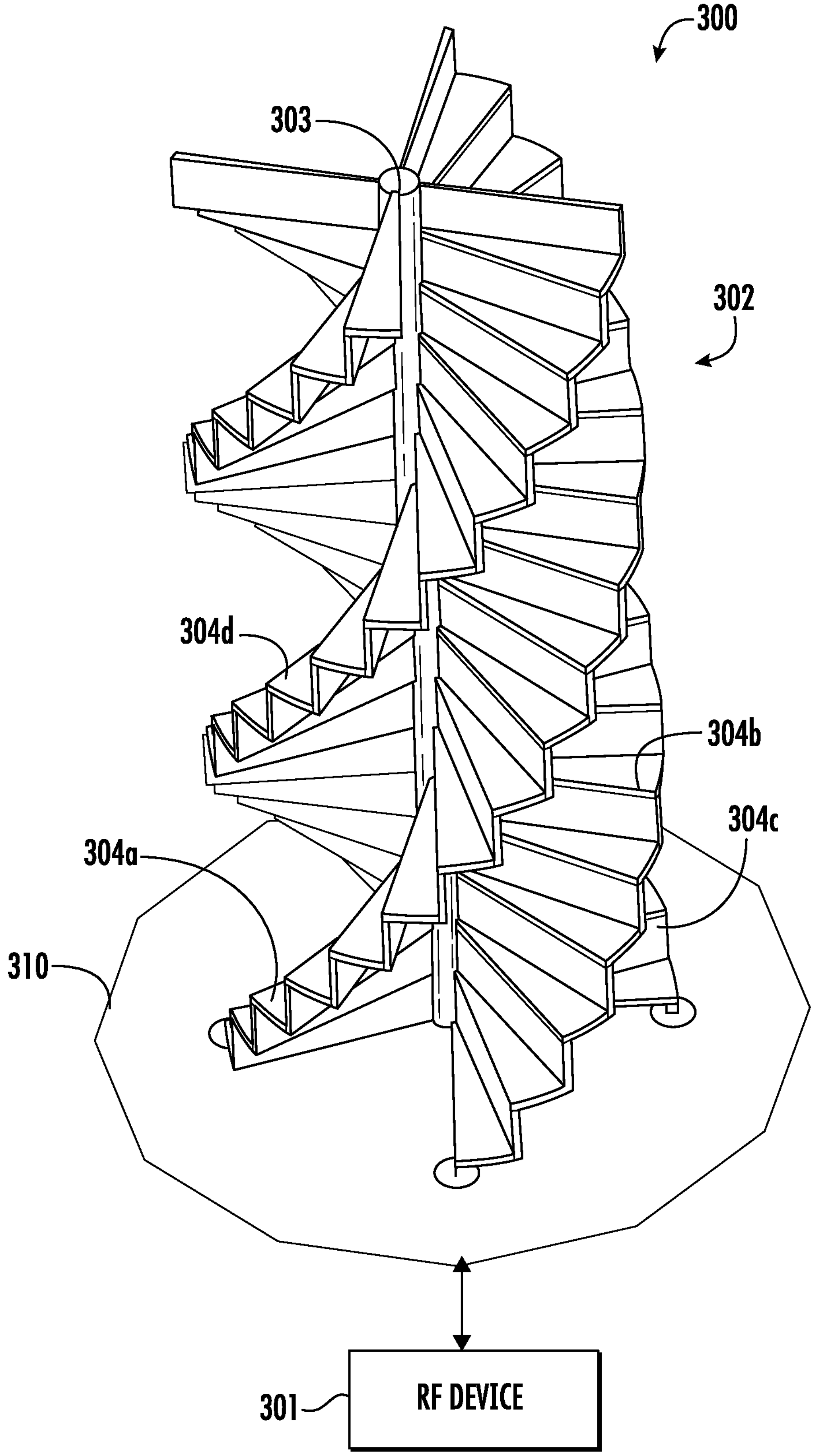
FIG. 7 is a perspective view of an electronic device, according to a third example embodiment of the present disclosure.
Figure 8:
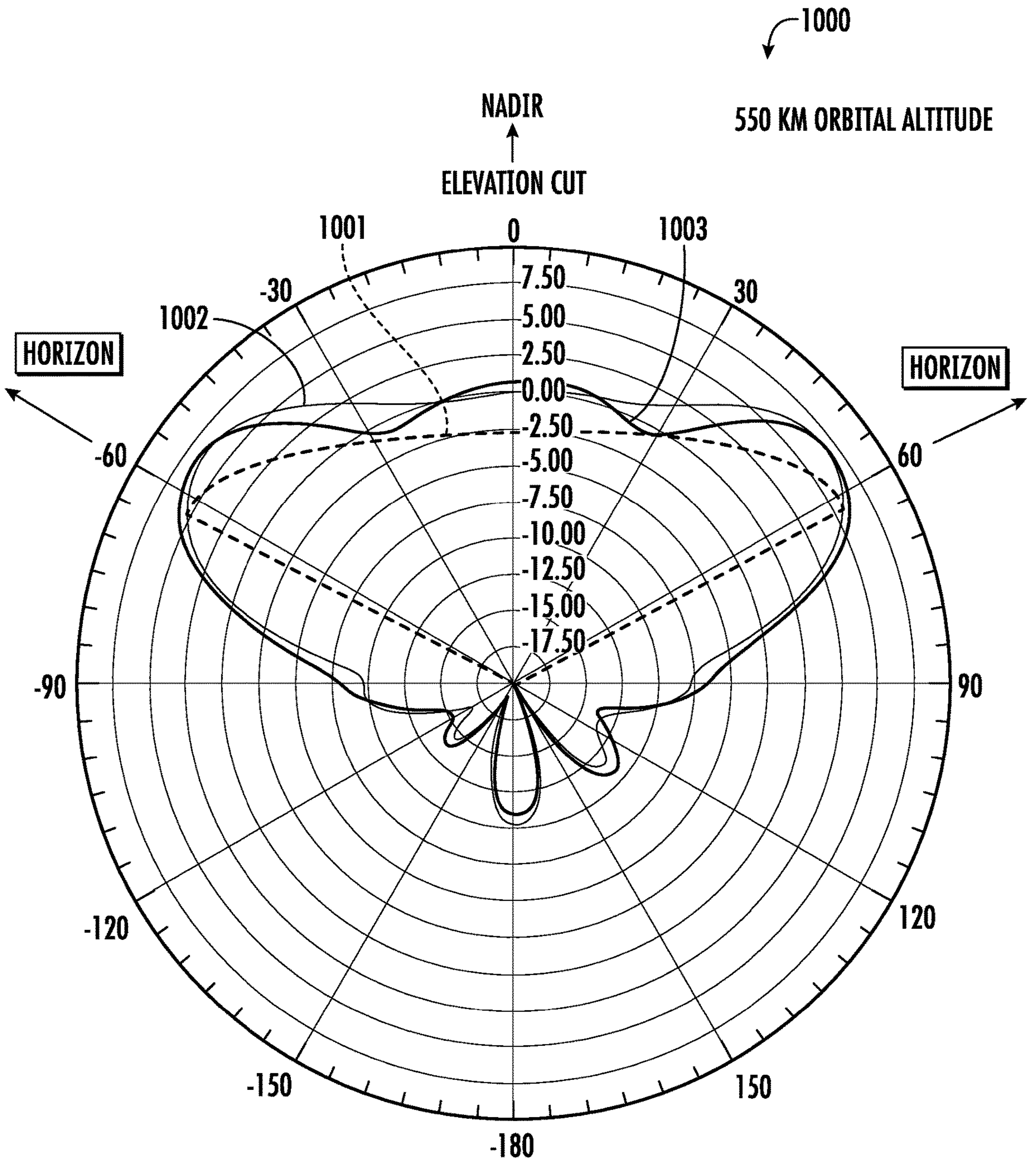
FIG. 8 is a radiation pattern diagram for the electronic device of the present disclosure.
Figure 9:
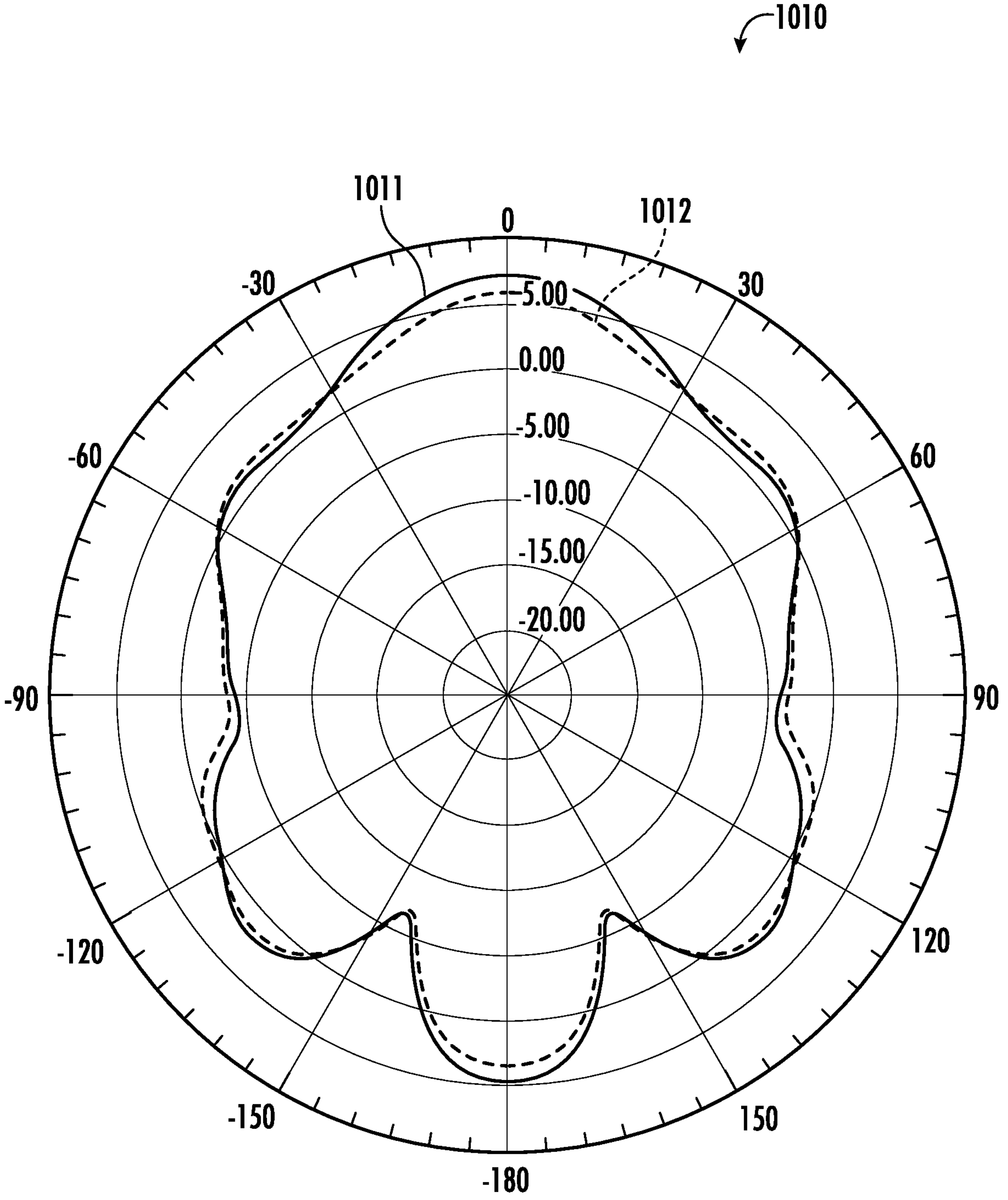
FIG. 9 is another radiation pattern diagram for the electronic device of the present disclosure.
Figure 10:
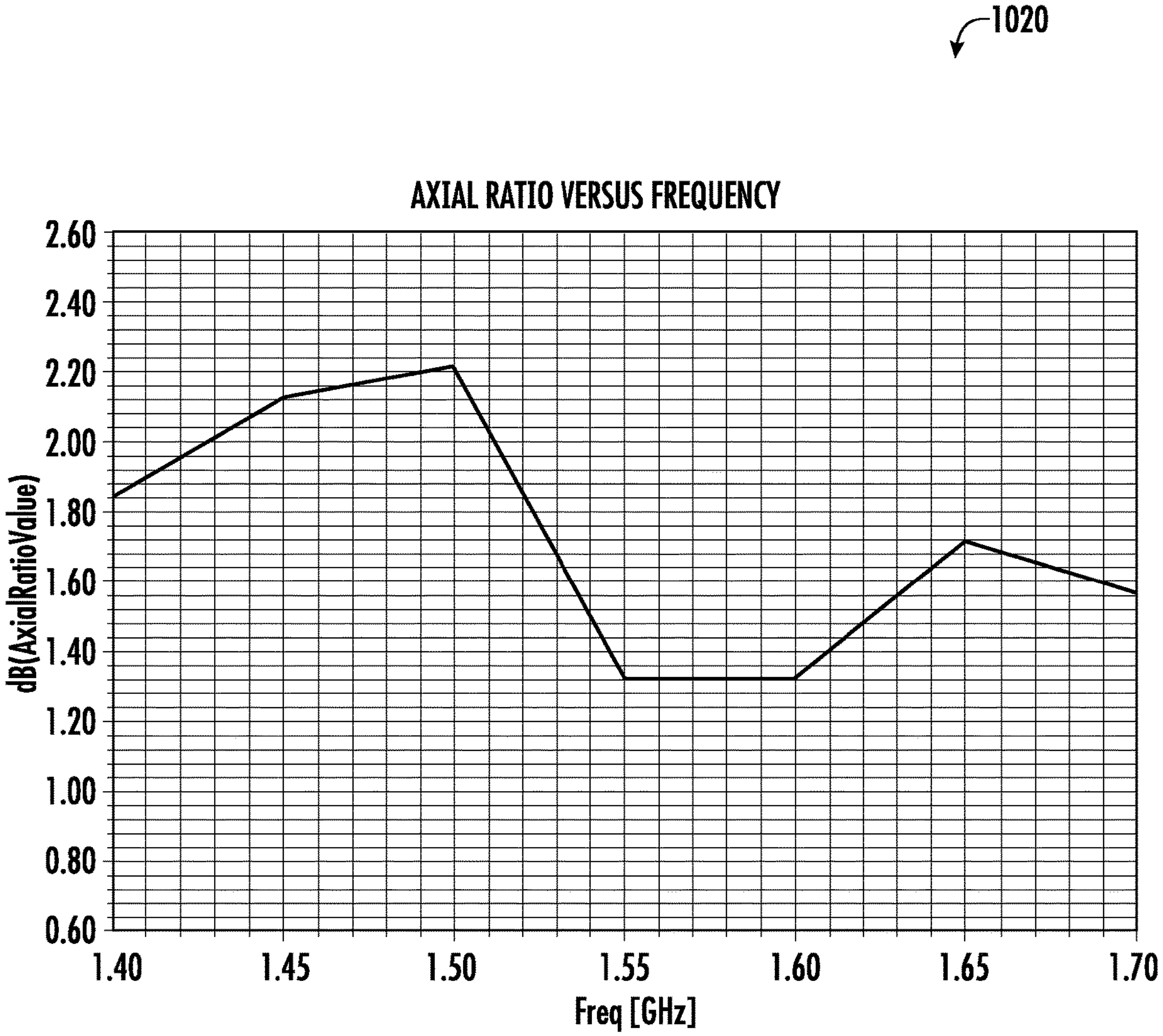
FIG. 10 is an axial ratio diagram for the electronic device of the present disclosure.

Referring now additionally to FIG. 7, another embodiment of the electronic device 300 is now described. In this embodiment of the electronic device 300, those elements already discussed above with respect to FIGS. 1-2 are incremented by 200 and most require no further discussion herein. This embodiment differs from the previous embodiment in that this electronic device 300 has the plurality of helically wound conductive strips 304*a*-304*d* each comprising a corrugated helically wound conductive strip.

Referring now to FIGS. 8-11, diagrams 1000, 1010, 1020 demonstrate performance of the electronic device 100, 200, 300. Diagram 1000 shows the isoflux Archimedean antenna radiation pattern of the antenna 102. As will be appreciated, this radiation pattern is well suited for LEO applications that may require isoflux radiation patterns. Curve 1001 represents an idealized isoflux pattern, providing near constant gain from each horizon and through the nadir. As will be appreciated, the sharp pattern corners at the Earth horizon are not practical as an infinite antenna size would be required. Curves 1002, 1003 represent gain results from frequency sweeps respectively beginning at 1.575 GHZ (phase 44°) and 1.625 GHZ (phase 44°) for the antenna 102. In particular, the isoflux Archimedean antenna radiation pattern of the antenna 102 is predicted based upon the formula d=0.145+0.000095 h, where d is the Archimedean screw antenna diameter in wavelengths and h is the orbital altitude of the transmitter.

Diagram 1010 shows the radiation pattern of the antenna 102 in a second mode, which produces an axial beam. Curves 1011, 1012 represent gain results from frequency sweeps respectively beginning at 1.575 GHz (phase 44°) and 1.625 GHZ (phase 44°). This second axial mode supports a higher altitude application than LEO, such as medium Earth orbit (MEO) or high Earth orbit (HEO). To achieve this mode of operation, the RF device 101 is configured to generate the plurality of feed signals with respective phase spacing of 0°, −90°, −180°, and −270° (counterclockwise direction in feed) and equivalent power of 0.25 Volts.

Diagram 1020 shows the axial ratio of the antenna 102. Here, the performance provides for excellent quality circular polarization. The RF device 101 has an e-field pattern, and helpfully, the radiated waves are emitted in only one physical location of the antenna 102, which is helpful in navigation antennas. As will be appreciated, in navigation antennas, the signal must not smear the transmitted antenna out in time, and provide for low dispersion. To best achieve this, the antenna needs to radiate from a single point in space. With the antenna 102, the radio wave is captured by the Archimedean screw structure as the wave forms, and the wave is conveyed end-to-end in the antenna. The radiation is emitted from the end in low dispersion fashion.

Figure 11:
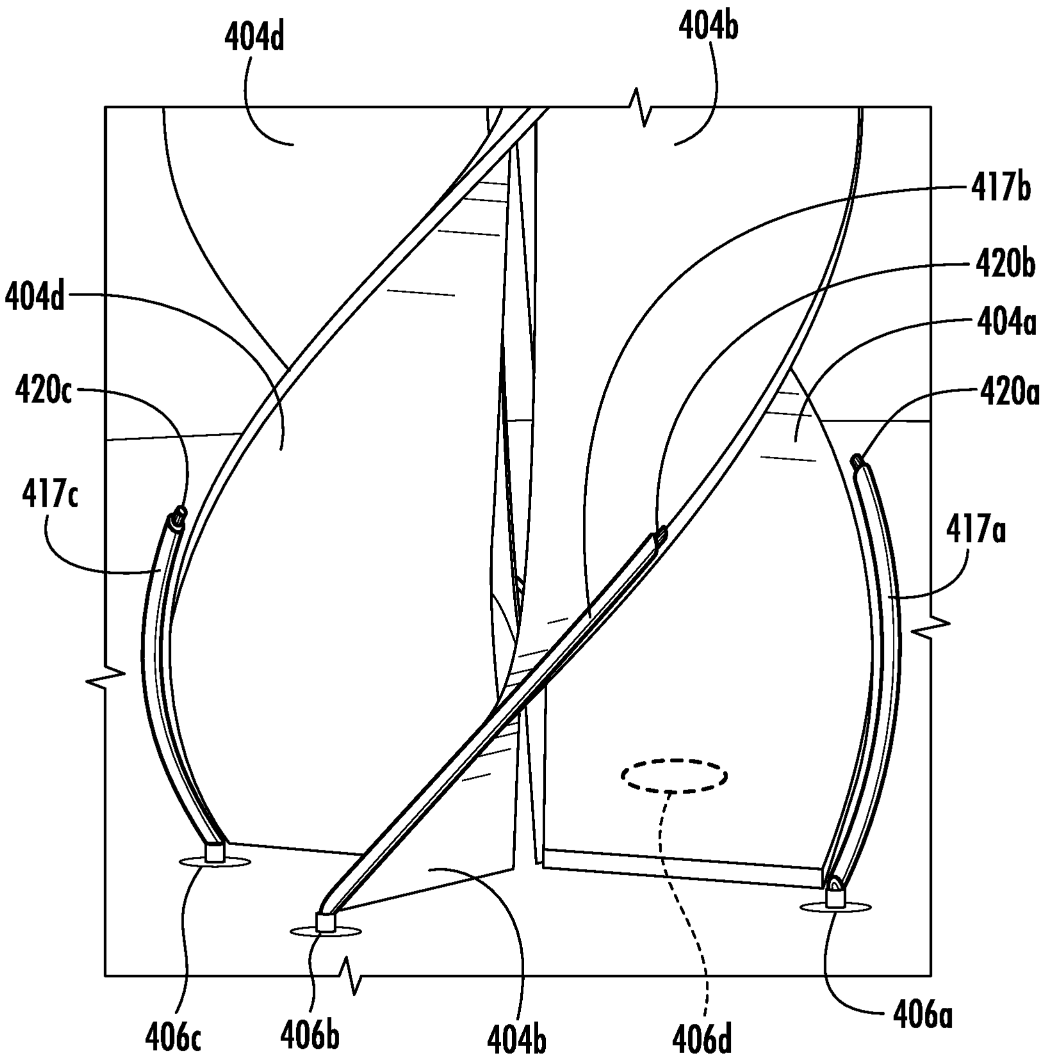
FIG. 11 is a perspective view of an electronic device, according to a fourth example embodiment of the present disclosure.

Referring now additionally to FIG. 11, another embodiment of the electronic device 400 is now described. In this embodiment of the electronic device 400, those elements already discussed above with respect to FIGS. 1-2 are incremented by 300 and most require no further discussion herein. This embodiment differs from the previous embodiment in that this electronic device 400 has an inductive feed structure.

It may be undesirable in some embodiments to feed energy in and out of the plurality of helically wound conductive strips 104*a*-104*d* by conductive electrical contact. The electronic device 400 illustratively includes insulated wires 417*a*-417*c* (fourth insulated wire not shown) placed along the outside edges of the plurality of helically wound conductive strips 404*a*-404*d*. Each of the insulated wires 417*a*-417*c* includes a conductive core 420*a*-420*c*, for example, a copper core. The insulated wires 417*a*-417*c* are electrically connected to the connector pin electrically conductive feeds 406*a*-406*d* by solder or other means, and make no other electrically conductive contact with other conductors. The RF energy communicates between the insulated wires 417*a*-417C and the plurality of helically wound conductive strips 404*a*-404*d* by electric and magnetic field induction. The insulated wires 417*a*-417*c* may preferentially be ¼ wavelength in length with a shortening factor of approximately $1/\sqrt{\varepsilon_r}$, where $\varepsilon_r$ is the dielectric constant of the insulated wire coating for the insulated wires insulation 417*a*-417*c*. Teflon or PTFE may be used to reduce or avoid dielectric losses in wire insulation. A properly adjusted insulated wire length will impart zero series reactance to the antenna fin helically wound conductive strip driving impedance.

Other features relating to communications devices are disclosed in co-pending applications: titled "COMMUNICATIONS DEVICE WITH RHOMBUS SHAPED-SLOT RADIATING ANTENNA AND RELATED ANTENNA DEVICE AND METHOD," application Ser. No. 18/048,070; titled "COMMUNICATIONS DEVICE WITH HELICALLY WOUND CONDUCTIVE STRIP AND RELATED ANTENNA DEVICES AND METHODS," application Ser. No. 17/447,830; titled "COMMUNICATIONS DEVICE WITH HELICALLY WOUND CONDUCTIVE STRIP WITH LENS AND RELATED ANTENNA DEVICE AND METHOD," application Ser. No. 17/650,574; and titled "COMMUNICATIONS DEVICE WITH HELICAL SLOT RADIATING ANTENNA AND RELATED ANTENNA DEVICE AND METHOD," application Ser. No. 18/048,092, all incorporated herein by reference in their entirety. It should be appreciated that any of the features from the embodiments of the communications devices disclosed in these related applications may be included in the electronic device 100, 200, 300.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An electronic device comprising:
- a radio frequency (RF) device;
- an antenna comprising
  - an elongate support, and
  - a plurality of helically wound conductive strips having inside edges carried by the elongate support and with adjacent conductive strips having an angular spacing therebetween; and
- an inductive feed structure coupling the RF device to the plurality of helically wound conductive strips, the inductive feed structure comprising a respective insulated conductor coupled to an outside edge of each helically wound conductive strip.

2. The electronic device of claim 1 wherein the plurality of helically wound conductive strips comprises four strips.

3. The electronic device of claim 2 wherein the angular spacing between adjacent strips is ninety degrees.

4. The electronic device of claim 1 wherein the elongate support comprises a dielectric rod.

5. The electronic device of claim 1 comprising a dielectric tube surrounding the plurality of helically wound conductive strips.

6. The electronic device of claim 1 wherein the antenna comprises a ground plane adjacent proximal ends of the plurality of helically wound conductive strips.

7. The electronic device of claim 1 wherein respective distal ends of the plurality of helically wound conductive strips are electrically coupled together.

8. The electronic device of claim 1 wherein each of the plurality of helically wound conductive strips has a constant helical pitch along the elongate support.

9. The electronic device of claim 1 wherein the antenna has an isoflux antenna gain pattern; and wherein the antenna has an operating frequency in a range of 1100-1700 MHZ; and wherein the antenna has a diameter between 0.2 and 0.6 wavelengths of the operating frequency.

10. An isoflux antenna device for a radio frequency (RF) device, the isoflux antenna device comprising:

an elongate support;

a plurality of helically wound conductive strips having inside edges carried by the elongate support and with adjacent conductive strips having an angular spacing therebetween; and an inductive feed structure for coupling the RF device to the plurality of helically wound conductive strips, the inductive feed structure comprising a respective insulated conductor coupled to an outside edge of each helically wound conductive strip.

11. The isoflux antenna device of claim 10 wherein the plurality of helically wound conductive strips comprises four strips.

12. The isoflux antenna device of claim 11 wherein the angular spacing between adjacent strips is ninety degrees.

13. The isoflux antenna device of claim 10 wherein the elongate support comprises a dielectric rod.

14. The isoflux antenna device of claim 10 comprising a dielectric tube surrounding the plurality of helically wound conductive strips.

15. The isoflux antenna device of claim 10 further comprising a ground plane adjacent proximal ends of the plurality of helically wound conductive strips.

16. The isoflux antenna device of claim 10 wherein respective distal ends of the plurality of helically wound conductive strips are electrically coupled together.

17. A method for making an antenna for an electronic device, the method comprising:

forming the antenna comprising an elongate support, and a plurality of helically wound conductive strips having inside edges carried by the elongate support and with adjacent conductive strips having an angular spacing therebetween; and coupling an inductive feed structure to the plurality of helically wound conductive strips, the inductive feed structure comprising a respective insulated conductor coupled to an outside edge of each helically wound conductive strip.

18. The method of claim 17 wherein the plurality of helically wound conductive strips comprises four strips.

19. The method of claim 18 wherein the angular spacing between adjacent strips is ninety degrees.

20. The method of claim 17 wherein the elongate support comprises a dielectric rod.

21. The method of claim 17 comprising providing a dielectric tube surrounding the plurality of helically wound conductive strips.

22. The method of claim 17 further comprising:

forming a ground plane adjacent proximal ends of the plurality of helically wound conductive strips; and electrically coupling respective distal ends of the plurality of helically wound conductive strips together.

23. An isoflux antenna device for a radio frequency (RF) device, the isoflux antenna device comprising:

an elongate support;

a plurality of helically wound, corrugated, conductive strips having inside edges carried by the elongate support and with adjacent conductive strips having an angular spacing therebetween; and a feed structure for coupling the RF device to the plurality of helically wound, corrugated, conductive strips.

24. The isoflux antenna device of claim 23 wherein the feed structure comprises an inductive feed structure.

25. The isoflux antenna device of claim 24 wherein the inductive feed structure comprises a respective insulated conductor coupled to an outside edge of each helically wound, corrugated, conductive strip.

26. The isoflux antenna device of claim 23 wherein the feed structure comprises a conductive feed structure.

27. The isoflux antenna device of claim 26 wherein the conductive feed structure comprises a plurality of electrically conductive feeds coupled to respective proximal ends of the plurality of helically wound, corrugated, conductive strips.

* * * * *